US009716796B2

(12) United States Patent
Cinar et al.

(10) Patent No.: US 9,716,796 B2
(45) Date of Patent: Jul. 25, 2017

(54) MANAGING COMMUNICATION EVENTS

(71) Applicant: Microsoft Technology Licensing, LLC, Redmond, WA (US)

(72) Inventors: Onur Cinar, Sunnyvale, CA (US); Vijay Chandrasekaran, Sunnyvale, CA (US); Daniel James Chastney, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 14/690,016

(22) Filed: Apr. 17, 2015

(65) Prior Publication Data

US 2016/0309038 A1    Oct. 20, 2016

(51) Int. Cl.
| | |
|---|---|
| *H04B 7/185* | (2006.01) |
| *H04W 4/00* | (2009.01) |
| *H04W 40/00* | (2009.01) |
| *H04W 24/00* | (2009.01) |
| *H04M 3/58* | (2006.01) |
| *H04L 29/08* | (2006.01) |
| *H04L 29/06* | (2006.01) |
| *H04M 7/00* | (2006.01) |

(52) U.S. Cl.
CPC .......... *H04M 3/58* (2013.01); *H04L 65/1059* (2013.01); *H04L 65/1069* (2013.01); *H04L 65/1073* (2013.01); *H04L 65/1076* (2013.01); *H04L 65/1079* (2013.01); *H04L 67/34* (2013.01); *H04M 7/0012* (2013.01)

(58) Field of Classification Search
CPC .......... H04M 3/42263; H04M 7/0057; H04M 3/42359

USPC ..... 455/12.1, 426.1, 435.1, 445, 456.2, 461; 715/758

See application file for complete search history.

(56) References Cited

U.S. PATENT DOCUMENTS

| | | |
|---|---|---|
| 5,239,571 A | 8/1993 | Takahashi |
| 5,260,988 A | 11/1993 | Schellinger et al. |
| 5,673,308 A | 9/1997 | Akhavan |
| 5,812,955 A | 9/1998 | Dent et al. |
| 5,842,122 A | 11/1998 | Schellinger et al. |

(Continued)

FOREIGN PATENT DOCUMENTS

| | | |
|---|---|---|
| EP | 1720365 | 11/2006 |
| EP | 2675148 | 12/2013 |

(Continued)

OTHER PUBLICATIONS

"International Search Report and Written Opinion", Application No. PCT/US2016/027172, Jul. 25, 2016, 12 pages.

(Continued)

*Primary Examiner* — William D Cumming

(57) ABSTRACT

A user terminal associated with a first user, the user terminal comprising a communication client application for managing communications with at least one further user terminal over a first network, the communication client application being configured to: determine with respect to at least one incoming call whether a further user terminal at the call origin point comprises the communication client application; and manage the reception of the call based on the determination of whether the further user terminal at the call origin point comprises the communication client application.

20 Claims, 8 Drawing Sheets

(56) References Cited

U.S. PATENT DOCUMENTS

| | | | |
|---|---|---|---|
| 5,894,592 A | 4/1999 | Brueske et al. | |
| 6,075,992 A | 6/2000 | Moon et al. | |
| 6,256,514 B1 | 7/2001 | Dent et al. | |
| 6,636,721 B2* | 10/2003 | Threadgill | H04B 7/18506 455/12.1 |
| 8,170,551 B2 | 5/2012 | Rahman et al. | |
| 8,554,781 B2 | 10/2013 | Teicher | |
| 8,660,246 B1 | 2/2014 | Brown | |
| 8,881,025 B2 | 11/2014 | Swink et al. | |
| 8,913,994 B2 | 12/2014 | Edwards et al. | |
| 2003/0140038 A1 | 7/2003 | Baker et al. | |
| 2005/0186960 A1* | 8/2005 | Jiang | H04L 29/06027 455/435.1 |
| 2006/0025158 A1* | 2/2006 | Leblanc | G01C 21/206 455/456.2 |
| 2006/0142012 A1* | 6/2006 | Kirchhoff | H04M 3/42357 455/445 |
| 2007/0042792 A1* | 2/2007 | Perfetto | H04M 3/42263 455/461 |
| 2007/0047726 A1 | 3/2007 | Jabbour et al. | |
| 2007/0263605 A1 | 11/2007 | Estevez et al. | |
| 2008/0045186 A1 | 2/2008 | Black et al. | |
| 2008/0153480 A1* | 6/2008 | Jiang | H04M 7/0057 455/426.1 |
| 2009/0191898 A1 | 7/2009 | Lewis et al. | |
| 2010/0114887 A1 | 5/2010 | Conway et al. | |
| 2010/0306191 A1 | 12/2010 | Lebeau et al. | |
| 2011/0078184 A1 | 3/2011 | Song et al. | |
| 2011/0238755 A1 | 9/2011 | Khan et al. | |
| 2012/0087367 A1 | 4/2012 | Anikin | |
| 2012/0309365 A1 | 12/2012 | Wang et al. | |
| 2012/0324568 A1 | 12/2012 | Wyatt et al. | |
| 2013/0102286 A1 | 4/2013 | Toksvig et al. | |
| 2013/0198171 A1 | 8/2013 | Shah et al. | |
| 2013/0282714 A1 | 10/2013 | Lathrom | |
| 2013/0283268 A1 | 10/2013 | Pearson | |
| 2013/0331070 A1 | 12/2013 | Aldecoa | |
| 2014/0068467 A1* | 3/2014 | Van | G06Q 10/107 715/758 |
| 2014/0192140 A1 | 7/2014 | Peevers et al. | |
| 2014/0258553 A1 | 9/2014 | Skeen et al. | |
| 2015/0049158 A1 | 2/2015 | Olatunji et al. | |
| 2015/0141060 A1 | 5/2015 | Shan et al. | |
| 2016/0065376 A1 | 3/2016 | Smith et al. | |
| 2016/0308811 A1 | 10/2016 | Cinar et al. | |
| 2016/0309040 A1 | 10/2016 | Cinar et al. | |

FOREIGN PATENT DOCUMENTS

| | | |
|---|---|---|
| EP | 2852105 | 3/2015 |
| EP | 2924962 | 9/2015 |
| WO | WO-2009010632 | 1/2009 |
| WO | WO-2009018840 | 2/2009 |
| WO | WO-2014123992 | 8/2014 |

OTHER PUBLICATIONS

"International Search Report and Written Opinion", Application No. PCT/US2016/027170, Jul. 25, 2016, 14 pages.

"International Search Report and Written Opinion", Application No. PCT/US2016/027173, Jul. 25, 2016, 15 pages.

Berg,"How to Use Telegram on iOS and Android", Retrieved at: http://www.laptopmag.com/articles/how-to-use-telegram, Mar. 5, 2014, 8 pages.

"Non-Final Office Action", U.S. Appl. No. 14/689,928, Aug. 19, 2016, 19 pages.

"Final Office Action", U.S. Appl. No. 14/689,928, Mar. 13, 2017, 16 pages.

"Non-Final Office Action", U.S. Appl. No. 14/690,080, Jan. 11, 2017, 16 pages.

"International Preliminary Report on Patentability", Application No. PCT/US2016/027172, Mar. 21, 2017, 8 pages.

"Second Written Opinion", Application No. PCT/US2016/027170, Mar. 10, 2017, 12 pages.

"Second Written Opinion", Application No. PCT/US2016/027173, Apr. 6, 2017, 8 pages.

* cited by examiner

MANAGING COMMUNICATION EVENTS

BACKGROUND

Some communication systems allow the user of a device or terminal, such as a personal computer, to conduct voice or video calls over a packet-based computer network such as the Internet as well as conventional circuit switched networks such as GSM and PSTN communication networks. Such communication systems include voice or video over internet protocol (VoIP) systems. These VoIP systems are beneficial to the user as they are often of significantly lower cost to use than the conventional fixed line (PSTN) or mobile cellular (GSM) networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

With increasing mobile bandwidths, there is increasing interest in providing packet-based voice and video calls via client applications running on user terminals or mobile devices such as Internet-enabled mobile phones. These mobile devices comprise transceivers such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

Embodiments of the present disclosure relate to management of communication events between first and second user terminals. In particular embodiments of the present disclosure relate to management of communication events using a communication client application (also known as communication client or communication client app). 'Using' a communication client application the user may dial a number to place an outgoing call. The call may be placed from the communication client app, or alternatively using the native communication client. The communication client app in such embodiments subscribes to call and dial events. When a number is dialed, or called, the communication client app checks to determine if the dialed number is flagged as a communication client user. This may be checked against a remote database, if querying for the first time, or against a local cache. In one embodiment the user is provided with the option to wait until the check is made before placing the call. If the number is flagged as one associated with a communication client user the call is placed using the communication client app. If it is not determined that the number is flagged as a communication client user, another application is used to initiate the call. In an embodiment the other application is the native communication client. In one embodiment the communication client app identifies the correct calling component of the other app in advance of the user initiating the call by attempting to place a call upon installation of the app.

The inventors have recognised managing the communication events in such a manner may be significant, especially for mobile devices with limitations with respect to network connectivity and processor power consumption.

In one aspect there is a user terminal associated with a first user, the user terminal comprising a communication client application for managing communications with at least one further user terminal over a first network, the communication client application being configured to: determine with respect to at least one incoming call whether a further user terminal at the call origin point comprises the communication client application; and manage the reception of the call based on the determination of whether the further user terminal at the call origin point comprises the communication client application.

According to a second aspect there is provided an apparatus comprising: at least one processor; and a memory comprising communication client application code for managing communications with at least one further apparatus over a first network, the code, when executed on the at least one processor, causes the apparatus to: determine with respect to at least one incoming call whether a further apparatus at the call origin point comprises the communication client application; and manage the reception of the call based on the determination of whether the further apparatus at the call origin point comprises the communication client application.

According to a third aspect there is a method for managing communications between user terminals over a first network, the method comprising: determining with respect to at least one incoming call whether a user terminal at the call origin point comprises the method for managing communications between user terminals over a first network; and managing the reception of the call based on the determination of whether the user terminal at the call origin point comprises the method for managing communications between user terminals over a first network.

BRIEF DESCRIPTION OF THE DRAWINGS

For a better understanding of the present disclosure and to show how it may be put into effect, reference is now made by way of example to the accompanying drawings in which.

DETAILED DESCRIPTION

Embodiments of the present disclosure are described by way of example only.

Figure 1:
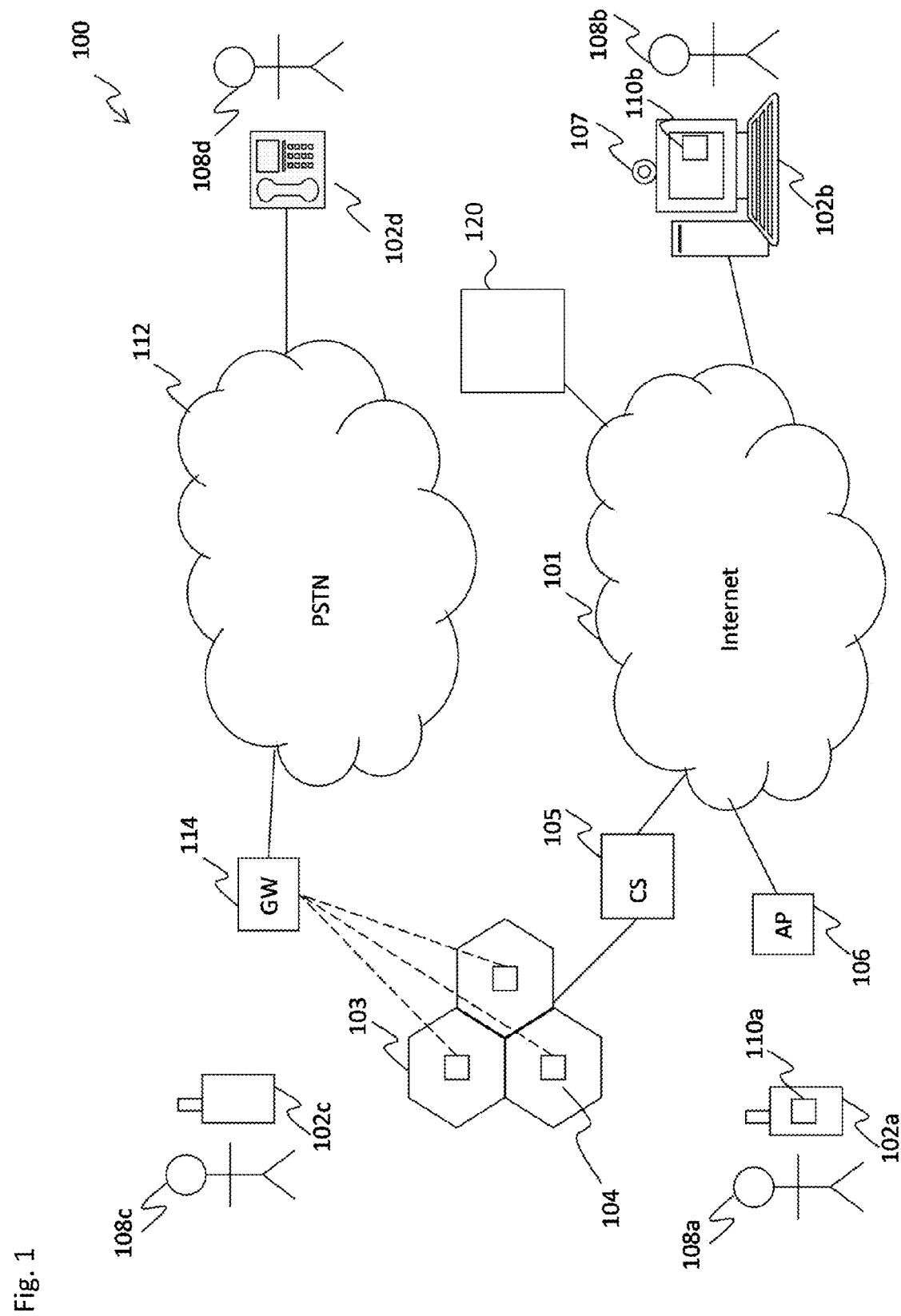
FIG. 1 is a schematic representation of a communication system.

FIG. 1 is a schematic illustration of a communication system 100 comprising a packet-based network 101 such as the Internet, a mobile cellular network 103, and a circuit switched network 112 such as the public switched telephone network (PSTN). The mobile cellular network 103 comprises a plurality of base stations 104 (sometimes referred to as node Bs in 3GPP terminology). Each base station 104 is arranged to serve a corresponding cell of the cellular network 103. Each base station 104 is connected to the circuit switched network 112 via a gateway 114. Further, the packet-switched network 101 comprises a plurality of wireless access points 106 such as Wi-Fi access points for accessing the Internet. These may be the access points of one or more wireless local area networks (WLANs).

A plurality of user terminals 102 are arranged to communicate over one or more of the networks 101,103,112. For merely illustration purposes only, FIG. 1 shows user terminal 102a as an Internet-enabled mobile device, user terminal 102b as a desktop or laptop PC, user terminal 102c as a cellular mobile phone 102c, and user terminal 102d as a landline telephone connected to the circuit switched network 112.

Figure 2:
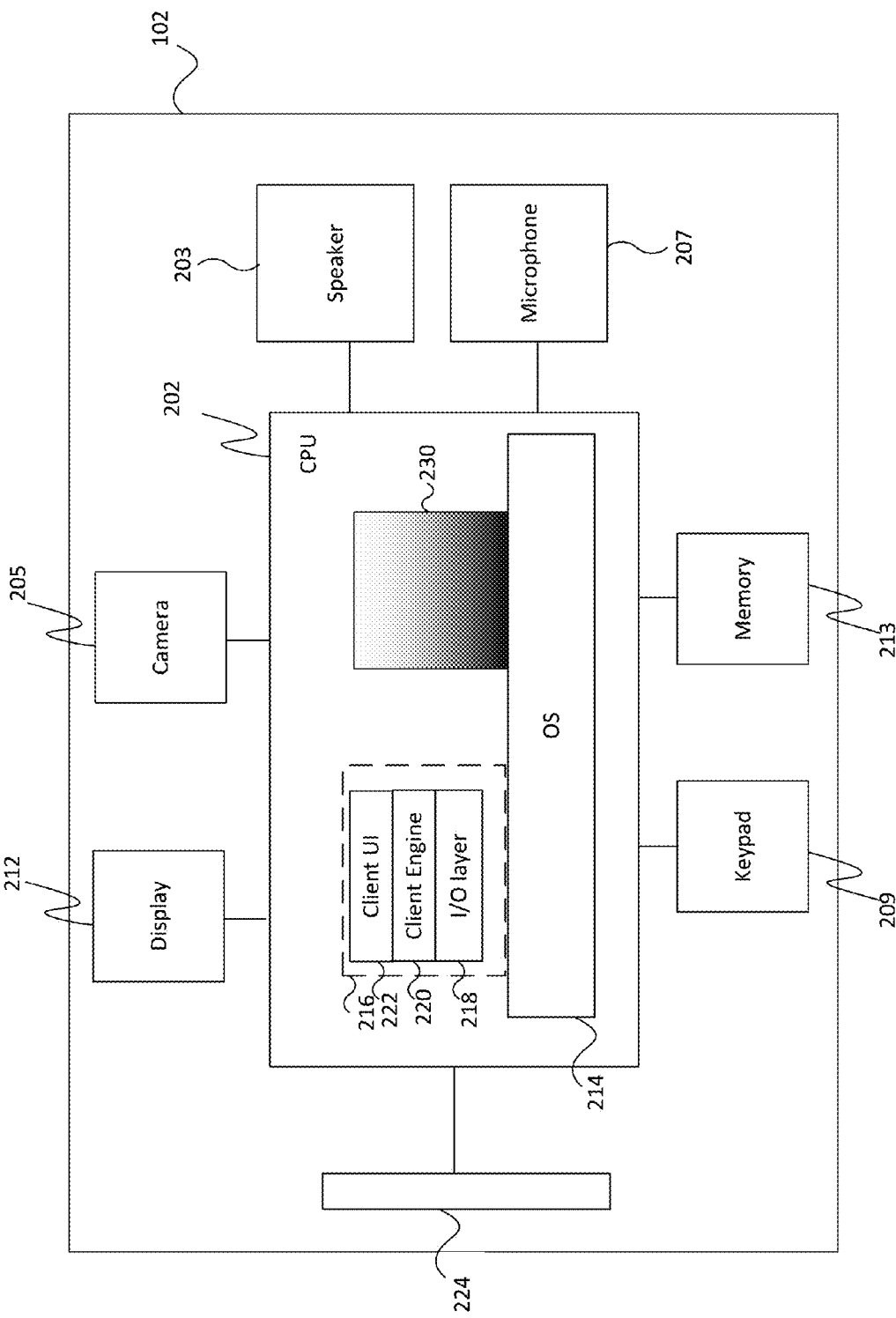
FIG. 2 is a schematic block diagram of a mobile terminal.

An example mobile device 102a is shown schematically in FIG. 2. The user terminal 102a may be one of an Internet-enabled mobile telephone; a handheld game console; a personal digital assistant (PDA); a tablet computer; or a laptop computer.

The user terminal 102a comprises a processing apparatus in the form of one or more processor units (CPUs) 202 coupled to a memory 213 storing a communication client application (or communication client app). The processor 202 is also coupled to: a microphone 207, a speaker 203, camera 205, one or more network interfaces 224, a keypad 209, and a display 212.

In the example shown in FIG. 2, the microphone 207, speaker 203, camera 205, keypad 209, and display 212 are examples of suitable user interface inputs and outputs. In some embodiments the user interface input may be a keyboard, mouse, pointing device, touchpad or any suitable user interface input device, for example gesture or motion control user input, head-tracking or eye-tracking user input, a 'touch' or 'proximity' detecting input configured to determine the proximity of the user to the display 212 (in other words a touch or hover touch interface).

The one or more network interface 224 enable the user terminal 102a to access the one or more networks 101,103, 112. For example, user terminal 102a may comprise a network interface for accessing the mobile cellular network 103 via the base stations 104, and/or a wired or wireless modem for accessing the Internet 101. In the case of a wireless modem, this typically comprises a network interface for accessing the Internet 101 via the wireless access points 106. For example in some embodiments the network interface may initiate packet based communication with a communication client application on another user terminal over the communication network (such as the internet network 101, or using an overlay network, or a tunneling network through the mobile cellular network 103, or a network distinct from the communication system 100).

Access to the Internet 101 may also be achieved by other means such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology or Radio Network Controllers (RNCs) in USTM or HSPA terminology.

The memory 213 may comprise a non-volatile memory such as an electronic erasable and programmable memory (EEPROM, or "flash" memory) coupled to the processor 202. The memory stores communications code arranged to be executed on the processor, and configured so as when executed to engage in communications over one or more networks 101,103,112. The communications code preferably comprises a communication client application (or communication client app) 110a provided by a software provider associated with the communication system. The communication client application 110a may be executed for performing communications such as voice or video calls with other user terminals 102 over the Internet 101, via a network interface 224 and wireless access points 106, and/or via the network interface 224, base stations 104 and controller stations 105 of the cellular network 103 as discussed above. However, one or more of the user terminals 102 involved could alternatively communicate via the network interface 224 and a wired modem, e.g. in the case of a call between a mobile terminal and a desktop PC The CPU 202 is connected to the network interface 224 such as a modem for communication with the communication networks. The network interface 224 may be integrated into the user terminal 102 as shown in FIG. 2. In alternative user terminals the network interface 224 is not integrated into the user terminal 102. The network interface 224 may comprise a short-range wireless transceiver for communication to the wireless access points or a cellular transceiver for communication to the base stations.

As shown in FIG. 1 both user terminals 102a and 102b execute communication client application software 110 in order for the user terminals 102a and 102b to transmit and receive data over the Internet 101. In other words the communication client application may be used to initiate packet based communication with another communication client application associated with the same communication network (which may for example be an overlay network or be distinct from the communication system 100). The communication client application may for example be configured to transmit and receive data associated with a defined communication protocol to define the 'network'. For example the communication client application may be configured to communicate with other communication client applications executed on further user terminals using a Voice over Internet Protocol (VoIP) protocol.

It is understood that in some embodiments a user terminal comprises some other client communication software, for example client communication software able to communicate over only one of the communication networks. The communication client application (CCA) 110 may be downloaded and installed from a remote server. Furthermore in some embodiments the communication client application 110 when first installed or executed may be configured to contact and register the installation or execution of the communication client application at a communication client application database. The communication client application database may comprise parts which are locally cached on the user terminal 102, or remote from the user terminal (for example on a server 120 or over a distributed computing system).

FIG. 2 also illustrates an operating system ("OS") 214 executed on the CPU 202. Running on top of the OS 214 is a software stack 216 for the communication client application (CCA) 110a. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the device 102a and handles the transmission and receipt of data via the network interface 207. The client protocol layer 218 of the communication client app communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 108a via the user interface of the client and to receive information from the user 108a via the user interface.

Also shown in FIG. 2 is a further communication client application 230. The further communication client may be a native communication client (the communication client provided with the device from the factory. The further communication client may thus be executed for performing communications such as voice or video calls with other user terminals 102 over the network interface 224, base stations 104 and controller stations 105 of the cellular network 103 as discussed above.

The following examples describe the use of a communication client application 110 following the user receiving an incoming call.

The communication client application in these embodiments may be configured to subscribe to incoming call notifications and end call notifications. On receipt of an incoming call the OS may inform the communication client app of the event including the incoming call number. The number may then be checked against a database (either local or remote) to determine if the number is associated with the communication client application. If the incoming number is not associated with the communication client application an end call card may be generated to provide the user with the option to send an invite to the number inviting the user to use the communication client app. Additionally the call end card may provide the user with the option to report the number as spam. In one embodiment, if the time between an incoming call event and end call event is below a predetermined threshold, the user is also provided with an option to provide feedback on the number accuracy of an overlaid caller ID.

Figure 3:
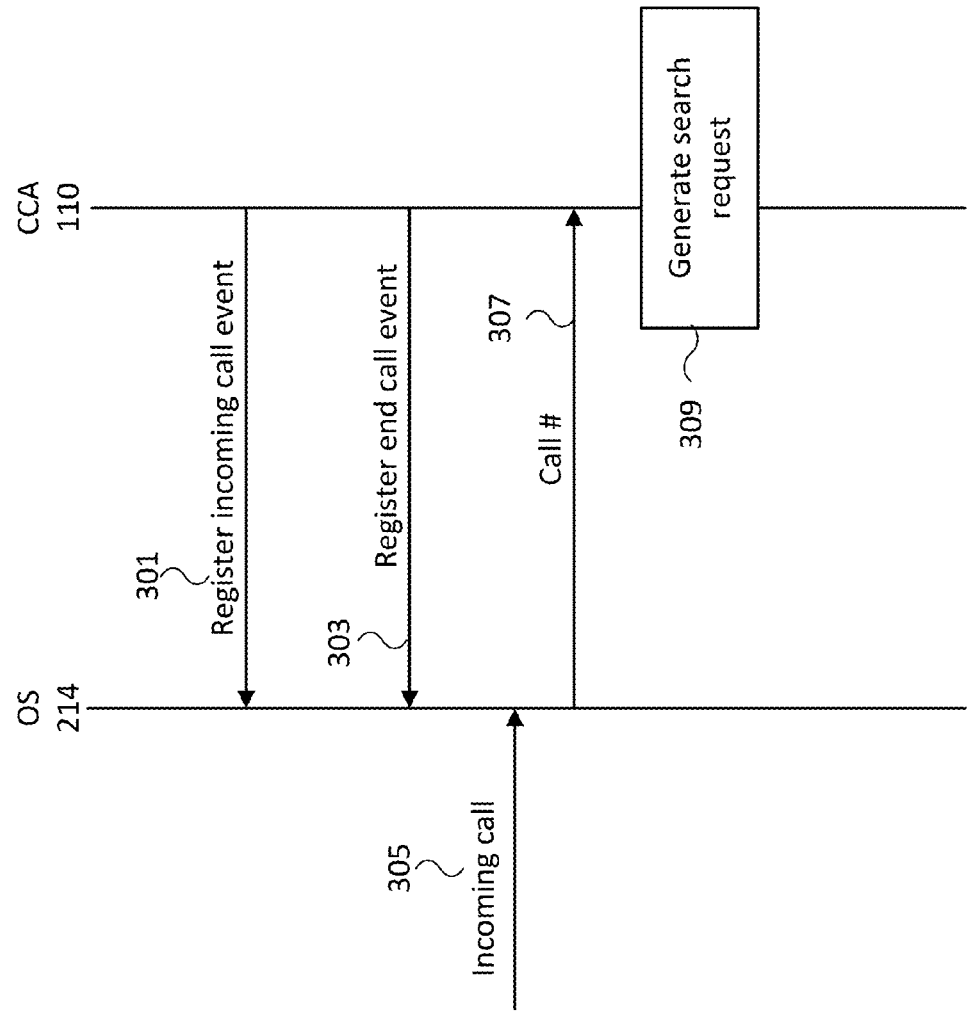
FIG. 3 is an example flow diagram of an event registration/search request generation operation for initializing a communication client application 'incoming call' management operation.

With respect to FIG. 3 a flow diagram of a communication client application event registration and search request generation for initializing a communication client application 'incoming call' management operation.

The communication client application 110 may be configured to generate and transmit register messages to the operating system 214 registering the communication client application at the operating system 214. This may for example comprise the communication client application 110 generating and transmitting a register message to the operating system 214 registering the communication client application for incoming call notifications.

The operation of registering the communication client application for incoming call event notification is shown in FIG. 3 by step 301.

Furthermore the communication client application 110 may be configured to generate and transmit a register message to the operating system 214 registering the communication client application for end call notifications.

The operation of registering the communication client application for end call event notification is shown in FIG. 3 by step 303.

The communication client application 110 having registered itself (for incoming and end call events) may then be manage incoming and end call events according to the following examples.

Thus for example when a number is dialed, or called, the communication client application may be configured to check or determine if the called number is flagged as also being a communication client application user (in other words whether the number calling is currently associated with apparatus or a device which is executing the communication client application).

This telephone number from the caller (or incoming call input) can be passed to the operating system (OS) 214.

The operation of receiving at the operating system 214 the telephone number from the caller is shown in FIG. 3 by step 305.

The OS 214 may then be configured to forward the telephone number from the caller (or call #) to the communication client application 110 as the communication client application had previously registered itself to receive incoming call event notifications.

The operation of forwarding the telephone number from the caller to the communication client application is shown in FIG. 3 by step 307.

The communication client application 110, having received the telephone number, can then generate a search request. The search request may be used to determine the identity of the user and/or determine whether the caller is 'spam' and/or determine whether the number being input (and called) is associated with the communication client application 110.

The operation of generating a search request for communication client information is shown in FIG. 3 by step 309.

Figure 4:
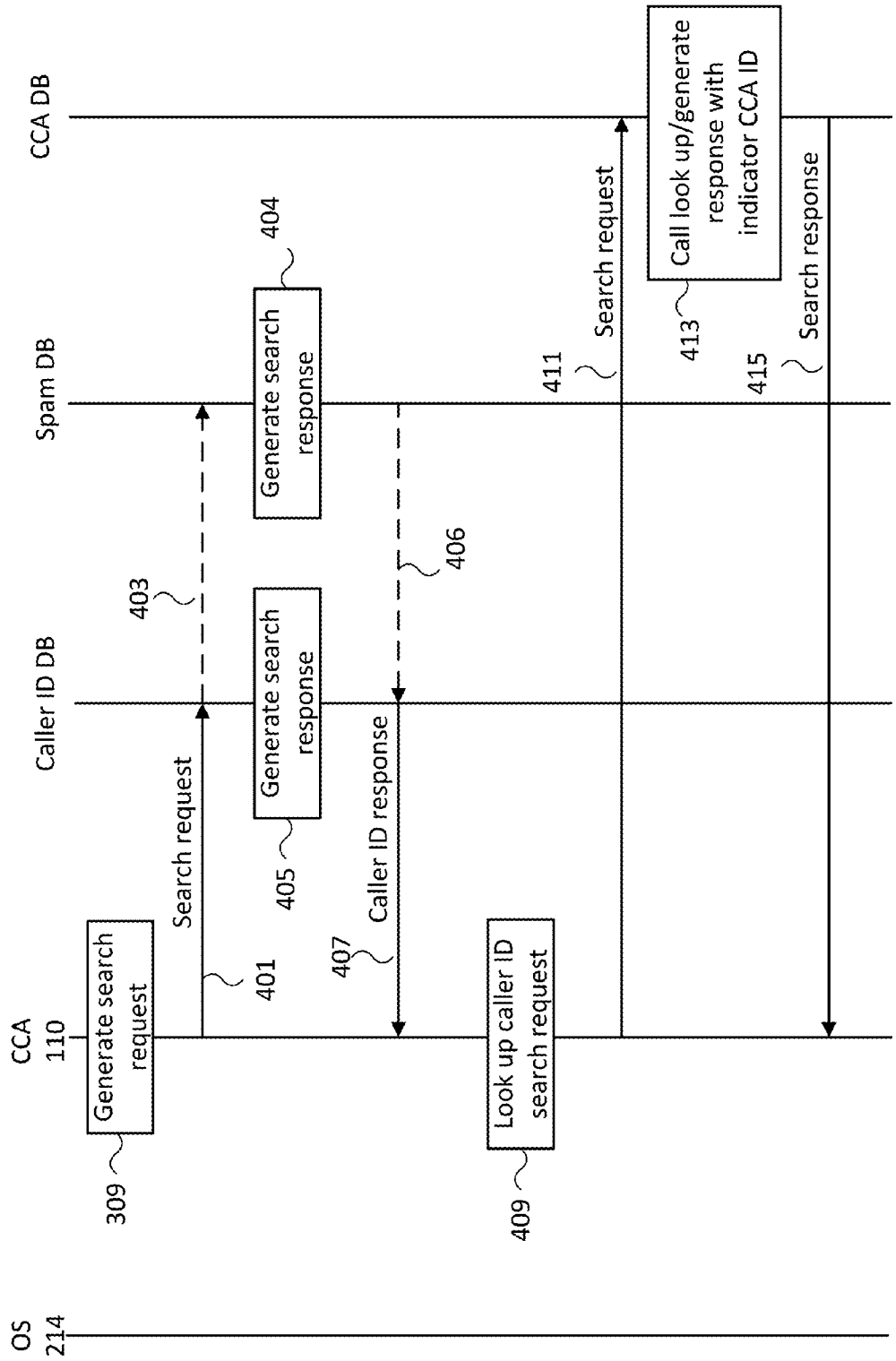
FIG. 4 is an example flow diagram of a search request management operation as part of a communication client application 'incoming call' management operation.

With respect to FIG. 4 a flow diagram of an example search request management operation as part of a communication client application 'incoming call' management operation is shown.

The figure shows the operation of generating a search request is shown by step 309. In the example shown herein a single search request is used to request information from the caller ID database (DB), and the 'Spam' DB and a further search request incorporating the caller ID value is generated and used to request information from the Communication client DB. However it is understood that in some embodiments separate search requests may be generated for each of the searches performed. Furthermore in the following examples the caller ID database (DB) and the 'Spam' DB searches are performed together and the Communication client DB search performed separately. However the ordering and the searching may be performed in any suitable order.

The communication client application, in the example shown in FIG. 4, may be configured to transmit the search request to a caller ID database. The caller ID DB may comprise parts which are locally cached on the user terminal 102, or remote from the user terminal (for example on a server 120 or over a distributed computing system).

The operation of transmitting the search request from the communication client application to the caller ID DB is shown in FIG. 4 by step 401.

The caller ID database, having received the search request, can be configured to look up the incoming call number to determine the associated user identifier value. The identifier may be considered to be an alternate credential for the user, which is associated with the communication client application. For example this look up may be an exchange from a phone number to a Skype ID. The caller ID DB may be configured to generate a suitable search response with the caller ID.

The operation of generating a caller ID search response is shown in FIG. 4 by step 405.

The caller ID search response can then be transmitted from the database to the communication client application.

The operation of transmitting the search response from the caller ID database to the communication client application is shown in FIG. 4 by step 407.

At substantially the same time the communication client application, in the example shown in FIG. 4, may be configured to transmit the search request to a spam database (DB). The spam DB may comprise parts which are locally cached on the user terminal 102, or remote from the user terminal (for example on a server 120 or over a distributed computing system).

The operation of transmitting the search request from the communication client application to the spam DB is shown in FIG. 4 by step 403.

The spam database, having received the search request, can be configured to look up the incoming call number to determine whether the number is on a spam blacklist. In some embodiments the spam database may maintain multiple blacklists such as a generic blacklist which is a list of numbers believed to be spam and a personal spam blacklist which is a list of numbers which have been identified by the user as being 'spam' or unwanted or blocked numbers (but may not necessarily considered to generally be 'spam'). In some embodiments the spam database may furthermore comprise whitelists which are lists of numbers identified by the user as not being 'spam' or unwanted or blocked numbers (but may generally be considered to be 'spam'). The spam DB may be configured to generate a suitable search response with flags indicating whether the number is identified (either generally or by the user) as being spam.

The operation of generating a spam DB search response is shown in FIG. 4 by step 404.

The spam DB search response can then be transmitted from the database to the communication client application.

The operation of transmitting the search response from the spam database to the communication client application is shown in FIG. 4 by step 406.

The response from the spam DB may be processed by the communication client application 110. For example in some embodiments the communication client application 110 may generate a notification or message to be displayed to the user that the incoming number appears to be spam and thus enable the user to confirm that the call is ok or not to receive.

In some embodiments the communication client application 110 may decide whether to accept or reject the call based on the response from the spam DB.

The communication client application 110, having received the caller ID information, can then generate a further search request. The search request may be used to determine whether the user with the caller ID (or associated with the calling number) is associated with the communication client application 110.

The operation of generating a caller ID based search request for is shown in FIG. 4 by step 309.

The use or search for the caller ID is employed in some embodiments to enable searches to be made against different databases and so provide a better chance of generating a favourable response. Thus for example the Caller ID search may be performed against a Bing DB, to display the name. The search to determine whether the caller is already using the communication client application may then be performed against a separate Microsoft/Skype DB.

The communication client application, may be configured to transmit the search request to a communication client database (DB). The communication client DB may comprise parts which are locally cached on the user terminal 102, or remote from the user terminal (for example on a server 120 or over a distributed computing system).

The operation of transmitting the caller ID search request from the communication client application to the communication client application database (CCA DB) is shown in FIG. 4 by step 411.

The communication client database, having received the search request, can be configured to look up the caller ID (or in some embodiments the calling number) to determine whether or not the caller ID is associated with the communication client application (in other words whether the user terminal being called is equipped with the communication client application also). The communication client database may be configured to generate a suitable search response comprising a flag indicating whether or not the caller ID is associated with the communication client application.

The operation of generating a suitable search response is shown in FIG. 4 by step 413.

The search response can then be transmitted from the database to the communication client application.

The operation of transmitting the search response from the communication client application database to the communication client application is shown in FIG. 4 by step 415.

It is understood that in some embodiments that a further local search may be implemented to determine whether the incoming call user terminal comprises the communication client application 110. For example in some embodiments the communication client application 110 may search the contact list on the user terminal or the 'recent number' cache information to determine whether the caller ID and/or calling number is a match for a user terminal which is equipped with the communication client application.

The communication client application 110 may then in some embodiments be configured to use this information. For example in some situations the communication client application can be configured to invite the user operating the user terminal from which the call is being placed to install the communication client application if it is determined that the user terminal is not executing or has not installed the communication client application. In such embodiments the user terminals may be equipped with the means to operate over communications networks other than a native communication client is configured to operate over and thus enable a more flexible and effective communication means to be employed to improve the user's experience of making and receiving calls.

Figure 5:
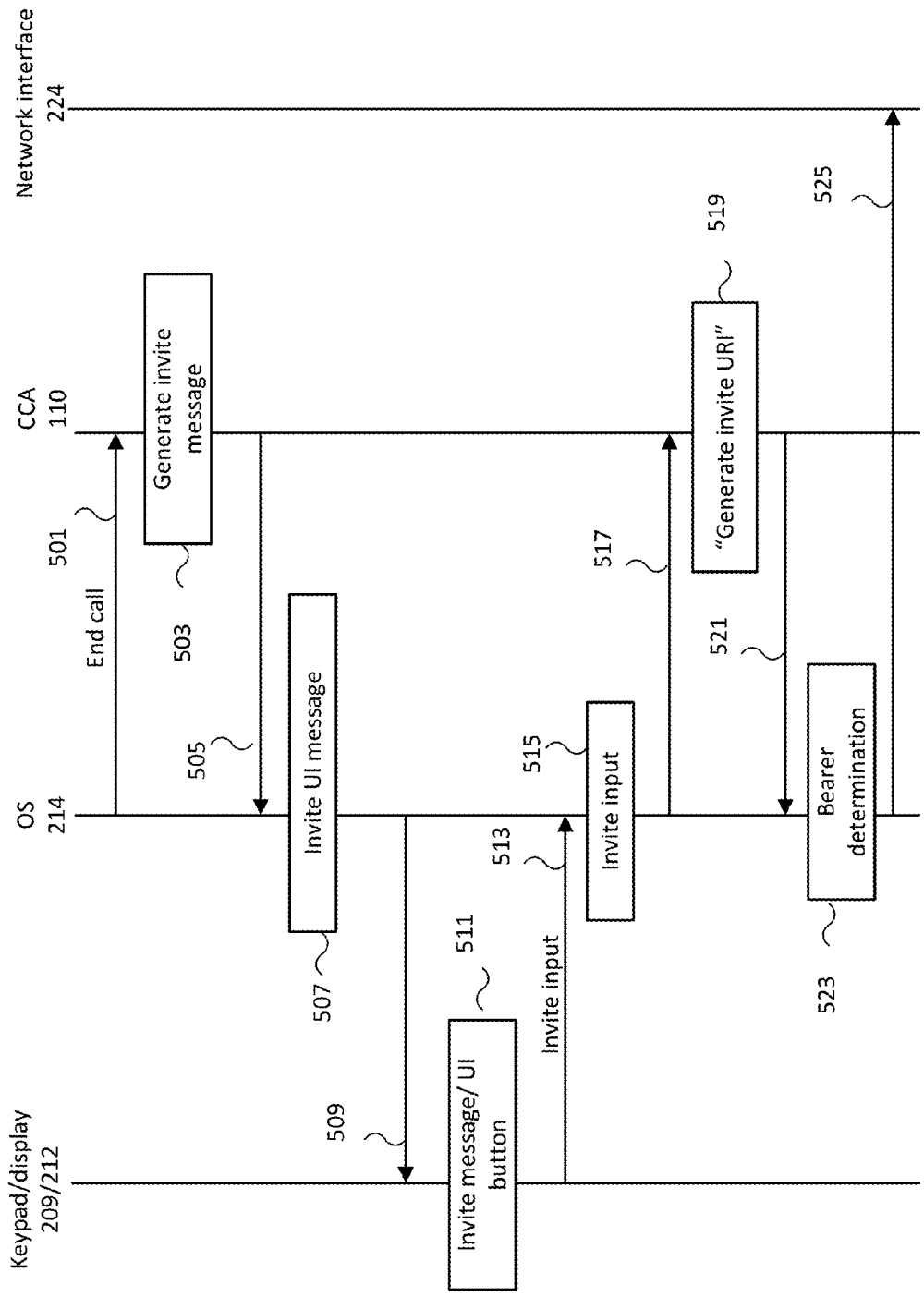
FIG. 5 is an example flow diagram of an invite generation operation as part of a communication client application 'incoming call' management operation.

With respect to FIG. 5 a flow diagram of an example invite generation operation is shown as part of the communication client application 'incoming call' management operation.

The OS 214 may then be configured to forward an end call notification (End Call) when the call has been ended by either party to the communication client application 110 as the communication client application had previously registered itself to receive end call event notifications.

The operation of forwarding the end call event notification from the OS to the communication client application is shown in FIG. 5 by step 501.

Having determined that the call, having just ended, was placed by a communication client application other than the communication client application 110 the communication client application may be configured to generate an invite message For example the communication client application 110 may be configured to generate an invite notification (or message or a suitable user interface button) to enable the user of the user terminal to select and to notify and invite the other party to install the communication client application.

The operation of generating the invite notification (message/user interface button) is shown in FIG. 5 by step 503.

This invite notification is transmitted from the communication client application 110 to the OS 214.

The operation of transmitting the invite notification to the operating system is shown in FIG. 5 by step 505.

The OS may then forward the notification or generate a suitable user interface command.

The operation of generating the invite UI notification/message to be displayed is shown in FIG. 5 by step 507.

The OS 214 may then be configured to transmit the invite UI notification/message to the display 212

The operation of transmitting the invite UI notification to the display 212 is shown in FIG. 5 by step 509.

The display 212 may then output the invite notification. The display 212 is shown as an example user interface output. However it is understood that the notification may be provided to the user by any suitable user interface output. For example the notification may be provided by an audio or voice notification.

Figure 8:
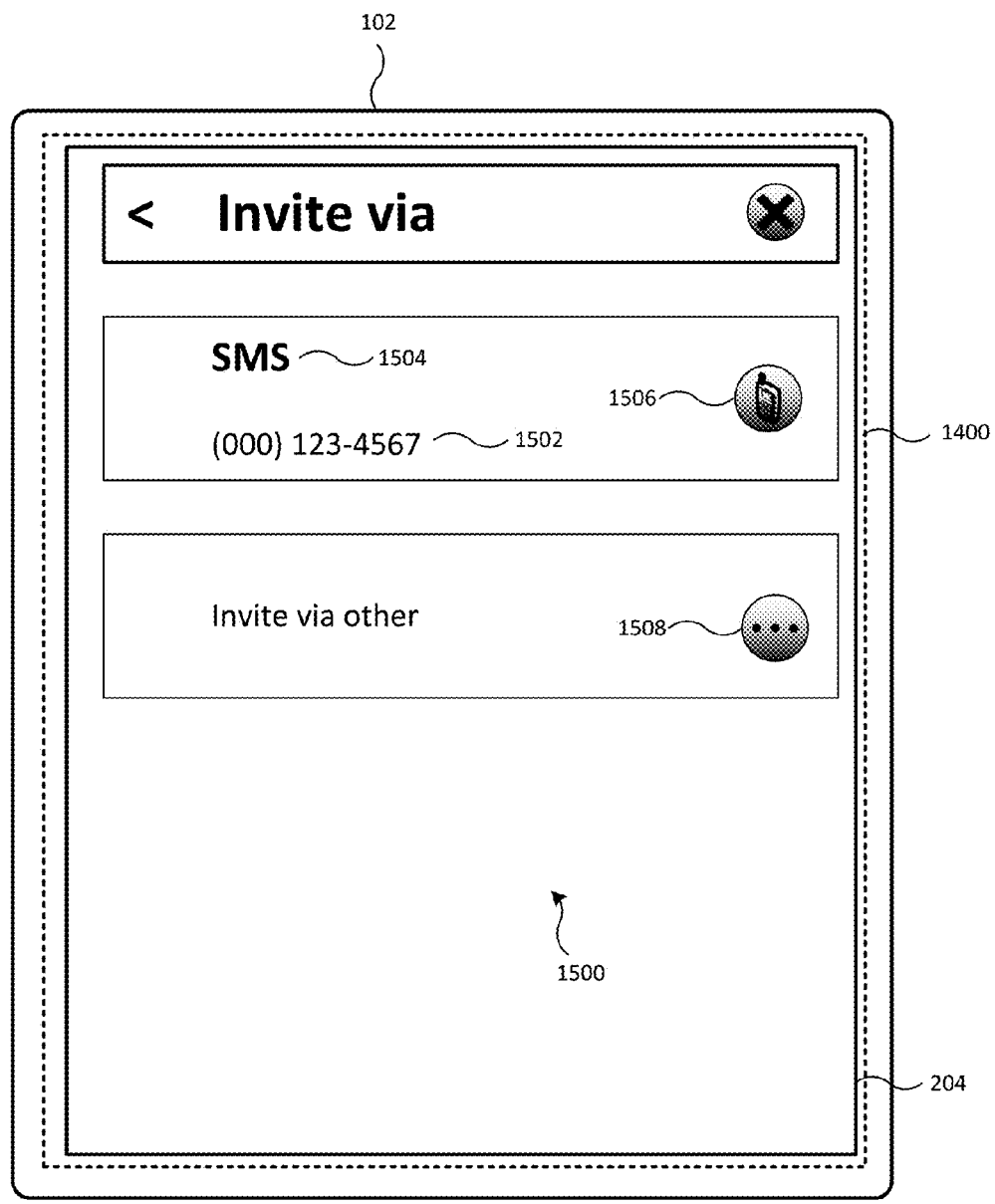
FIG. 8 is an example invite UI message.

Furthermore FIG. 8 shows an example invite message 1500 displayed on the display 212.

FIG. 8 shows the client user interface provided by the communication client application 112 displays content in the available area 1400 of the display 212. As depicted in FIG. 9, the available area 1400 of the display 212 is the whole of the display. However, it is envisaged that the available area of the display (that is the area available to the communication client application) may constitute only a portion of the display e.g. with the remainder of the display being used by the OS 214 and/or other application(s) executed thereon to display other content.

The invite message 1500 may for example show the bearer information 1504 (in this example SMS) over which the invite is to be sent, the number of the outgoing call 1502, the UI interaction element 1506 to ok the sending of the invite, and an alternative bearer selector 1508 to select a different bearer to send the invite.

Furthermore the keypad 209 or other user interface input may be used to determine whether or not an 'invite' input is entered in response to the notification. For example the notification is a request asking whether the user wishes to invite the other party to install the communication client application and thus communicate (at a later time) over the bearer and communications networks managed by the communication client application 110 and requests a key to be pressed to confirm the invite should be sent.

The operation of displaying a notification and determining an invite input in response to the notification is shown in FIG. 5 by step 511.

Where the user responds to the invite by generating an invite input, such as pressing a key on the keypad to indicate a positive response to the notification, then this keypad response is transmitted to the OS 214.

The transmitting of the invite input (the keypad response) to the OS 214 is shown in FIG. 5 by step 513.

The operating system may then generate an invite input message in response to the invite input and pass this to the communication client application 110.

The operation of generating the invite input message for the communication client application 110 is shown in FIG. 5 by step 515.

The OS 214 may then transmit the invite input message to the communication client application 110.

The operation of transmitting the invite input message to the communication client application is shown in FIG. 5 by step 517

The communication client application 110, on receiving the invite input message from the OS, may then be configured to generate an invite message to be transmitted to the other user terminal.

For example the invite message may be combination of text 'Do you want to use this communication client Application, I am!' and an URL with the address of the installation files for the communication client application and other information.

The operation of generating the invite message is shown in FIG. 5 by step 519.

The invite message may then be transmitted from the communication client application 110 to the OS 214.

The operation of transmitting the invite message to the OS 214 is shown in FIG. 5 by step 521.

The OS, having received the message may be configured to select one of the available bearers for informing the other party. The bearer may be any suitable method for communicating communication client application installation invites to the other user terminal. For example the invite bearer may be email, SMS, multimedia message, instant messenger message, chat message etc.

The operation of determining or selecting a suitable invite bearer is shown in FIG. 5 by step 523.

The invite message may then be transmitted via the suitable bearer and the network interface 224 to the other party.

The operation of transmitting the invite message to the network interface 224 to be sent via the selected bearer from the network interface is shown in FIG. 5 by step 525.

Figure 6:
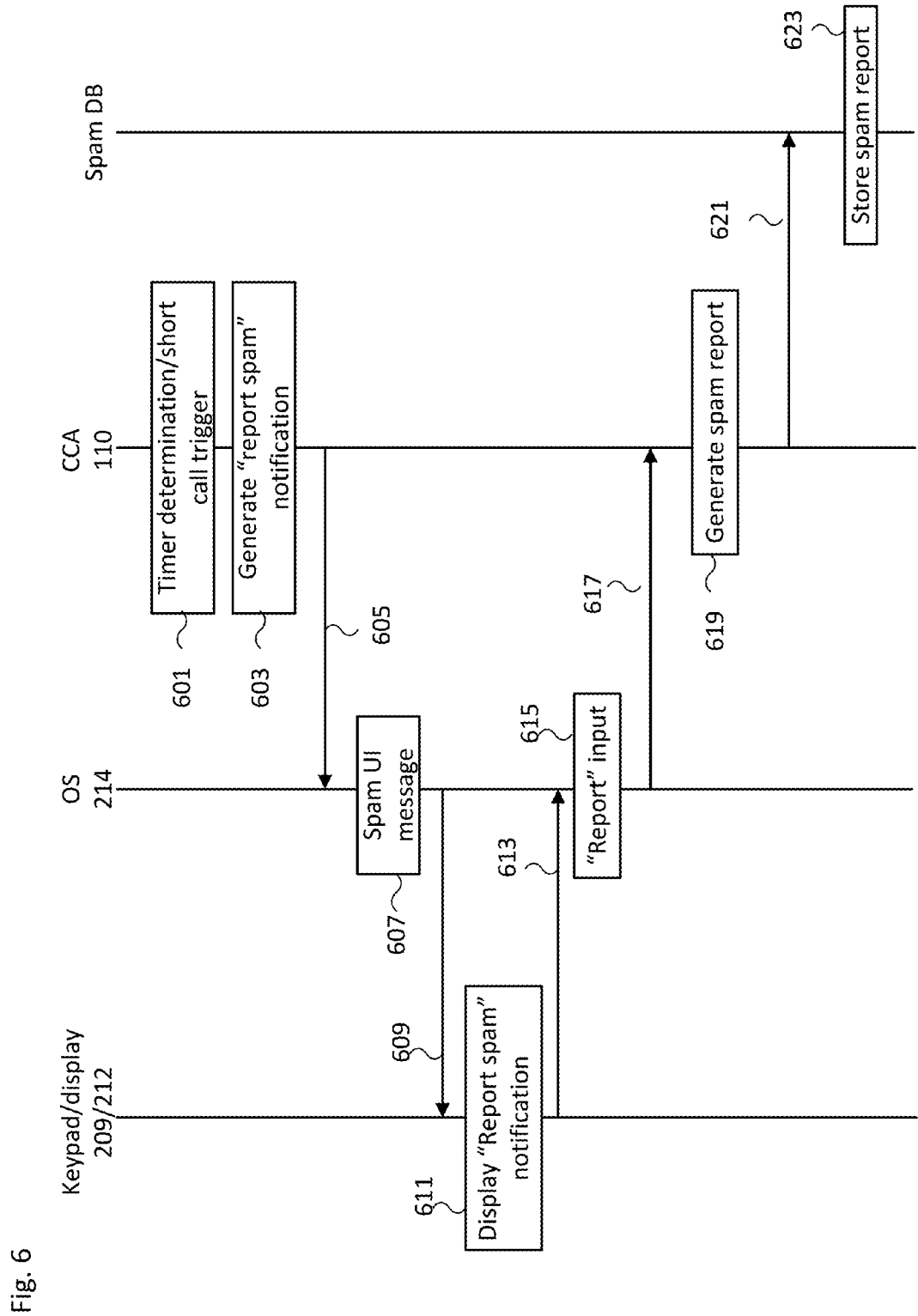
FIG. 6 is an example flow diagram of a spam reporting operation as part of a communication client application 'incoming call' management operation.

In some embodiments the communication client application may furthermore be configured to enable management of entries on the spam DB. For example FIG. 6 shows an example flow diagram of a spam reporting operation as part of a communication client application 'incoming call' management operation.

For example in some embodiments the communication client application is configured to maintain a timer recording the length of a call from the incoming call event to the hang up event.

In some embodiments the communication client application 110 may be configured to determine if a call timer is less than a determined period. This for example may be because the number calling the user terminal is autocalling device which calls multiple numbers at the same time and then connects the user to a call centre when the user answers the call. However when the number of users which answer the call is greater than the number of available lines to connect with the call centre members then a call is terminated. This produces frustration and alarm for many users.

The determined period or threshold may in some embodiments be determined or configured either manually using a user selectable input or remotely by a server. The threshold may, for example, be set at 5 seconds.

The operation of determining a call length being less than a determined threshold period is shown in FIG. 6 by step 601.

The communication client application, having determined that the call period was less than the determined time period may be configured to generate a 'report spam' notification message.

For example the communication client application 110 may be configured to generate a report spam notification (or message or a suitable user interface button) to enable the user of the user terminal to select and to generate a report that the number is to be entered on to a blacklist.

The operation of generating the 'report spam' notification (message/user interface button) is shown in FIG. 6 by step 603.

This 'report spam' notification may then be transmitted from the communication client application 110 to the OS 214.

The operation of transmitting the 'report spam' notification to the operating system is shown in FIG. 6 by step 603.

The OS may then forward the notification or generate a suitable user interface command.

The operation of generating the 'report spam' UI notification/message to be displayed is shown in FIG. 6 by step 607.

The OS 214 may then be configured to transmit the 'report spam' UI notification/message to the display 212.

The operation of transmitting the 'report spam' UI notification to the display 212 is shown in FIG. 6 by step 609.

The display 212 may then output the 'report spam' notification. The display 212 is shown as an example user interface output. However it is understood that the notification may be provided to the user by any suitable user interface output. For example the notification may be provided by an audio or voice notification.

Furthermore the keypad 209 or other user interface input may be used to determine whether or not a 'report spam' input is entered in response to the notification. For example the notification is a request asking whether the user wishes to report the call and thus generate a spam report (at a later time) and requests a key to be pressed to confirm the report should be generated and sent.

The operation of displaying a 'report spam' notification and determining a 'report spam' input in response to the notification is shown in FIG. 6 by step 611.

Where the user responds to the 'report spam' notification by generating a 'report spam' input, such as pressing a key on the keypad to indicate a positive response to the notification, then this keypad response is transmitted to the OS 214.

The transmitting of the 'report spam' input (the keypad response) to the OS 214 is shown in FIG. 6 by step 613.

The operating system may then generate a 'report spam' input message in response to the 'report spam' input and pass this to the communication client application 110.

The operation of generating the 'report spam' input message for the communication client application 110 is shown in FIG. 6 by step 615.

The OS 214 may then transmit the invite input message to the communication client application 110.

The operation of transmitting the invite input message to the communication client application is shown in FIG. 6 by step 617

The communication client application 110, on receiving the 'report spam' input message from the OS, may then be configured to generate a spam report comprising the caller ID and/or the caller number to be transmitted to the spam DB.

The operation of generating the spam report message is shown in FIG. 6 by step 619.

The invite message may then be transmitted from the communication client application 110 to the Spam DB. This may for example be performed by messages transmitted via the OS 214 and the network interface 224.

The operation of transmitting the spam report to the spam DB is shown in FIG. 6 by step 621.

The spam DB may then process the spam report. For example the spam report may be stored in one of the black lists such that any future calls from the same caller ID or number may be indicated as being potentially spam.

The operation of storing the spam report is shown in FIG. 6 by step 623.

In some embodiments the communication client application 110 may furthermore be configured to enable call management of the incoming call to enable a call transfer to occur form the native communication client to the communication client application bearer. Thus for example the call which is to be placed over a cellular network may be transferred to a VoIP call when it is determined that both of the user terminals may be equipped with the communication client application.

Figure 7:
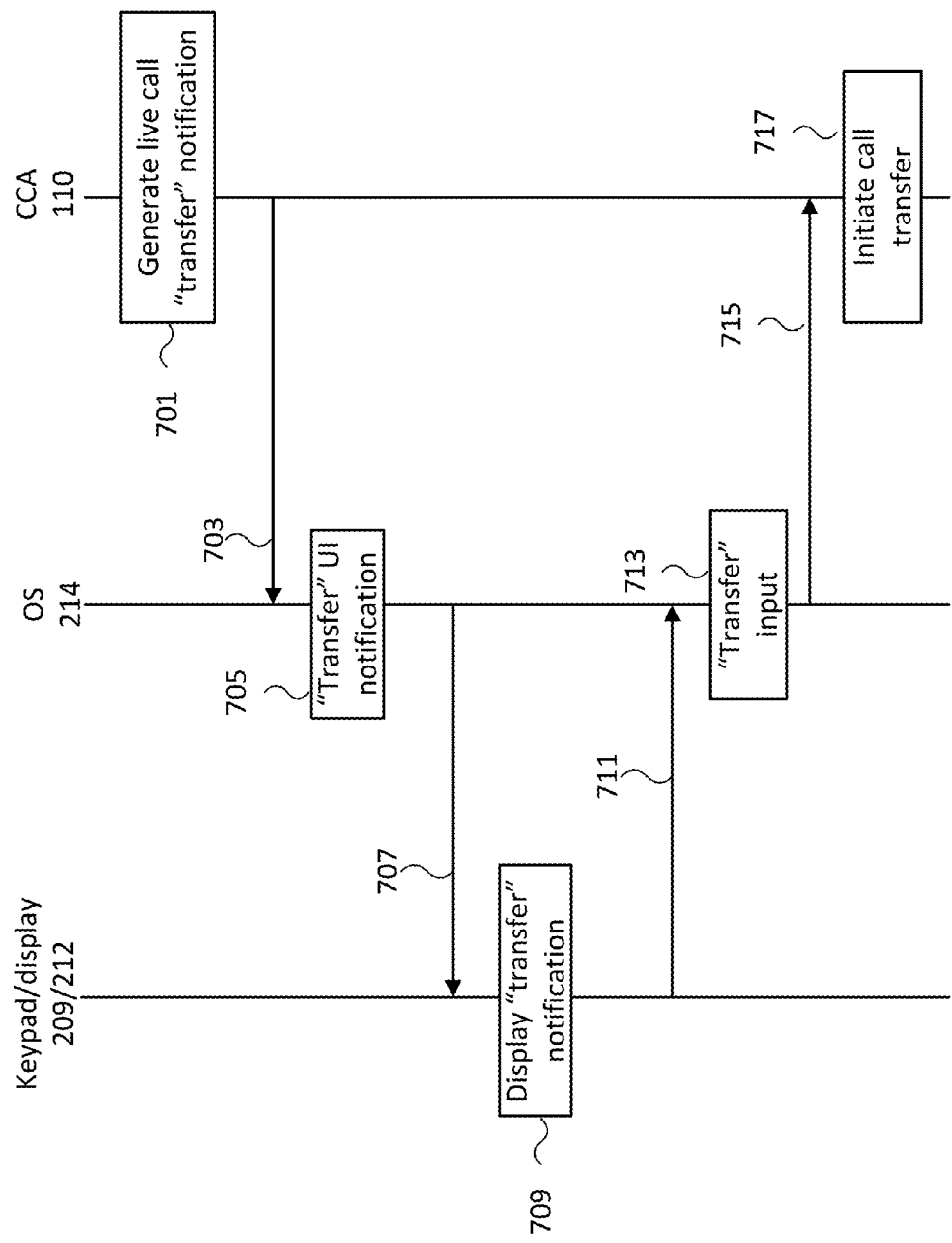
FIG. 7 is an example flow diagram of a live call transfer operation as part of a communication client application 'incoming call' management operation.

For example FIG. 7 shows an example flow diagram of a live call transfer operation as part of a communication client application 'incoming call' management operation.

For example in some embodiments the communication client application is configured to determine that a current call (either in the process of being accepted or having been accepted) originates from a user terminal which may place the call using their communication client application (in other words place a communication client to communication client call).

In some embodiments the communication client application 110 may be configured to determine when a current call is associated with the communication client application identifier or flag. For example this may be result of processing the communication client DB search response described earlier. If the call is associated with the communication client application, the communication client application may be configured to generate a live call 'transfer' notification message.

The operation of generating the live call 'transfer' notification (message/user interface button) is shown in FIG. 7 by step 701.

This live call 'transfer' notification may then be transmitted from the communication client application 110 to the OS 214.

The operation of transmitting the live call 'transfer' notification to the operating system is shown in FIG. 7 by step 703.

The OS may then forward the notification or generate a suitable user interface command.

The operation of generating the live call 'transfer' UI notification/message to be displayed is shown in FIG. 7 by step 705.

The OS 214 may then be configured to transmit the live call 'transfer' UI notification/message to the display 212.

The operation of transmitting the live call 'transfer' UI notification to the display 212 is shown in FIG. 7 by step 707.

The display 212 may then output the live call 'transfer' notification. The display 212 is shown as an example user interface output. However it is understood that the notification may be provided to the user by any suitable user interface output. For example the notification may be provided by an audio or voice notification.

Furthermore the keypad 209 or other user interface input may be used to determine whether or not a live call 'transfer' input is entered in response to the notification. For example the notification is a request asking whether the user wishes to transfer the call and requests a key to be pressed to confirm the call is to be transferred.

The operation of displaying a live call 'transfer' notification and determining a live call 'transfer' input in response to the notification is shown in FIG. 7 by step 709.

Where the user responds to the live call 'transfer' notification by generating a live call 'transfer' input, such as pressing a key on the keypad to indicate a positive response to the notification, then this keypad response is transmitted to the OS 214.

The transmitting of the live call 'transfer' input (the keypad response) to the OS 214 is shown in FIG. 7 by step 711.

The operating system may then generate a live call 'transfer' input message in response to the live call 'transfer' input and pass this to the communication client application 110.

The operation of generating the live call 'transfer' input message for the communication client application 110 is shown in FIG. 7 by step 713.

The OS 214 may then transmit the live call 'transfer' input message to the communication client application 110.

The operation of transmitting the live call 'transfer' input message to the communication client application is shown in FIG. 7 by step 715

The communication client application 110, on receiving the live call 'transfer' input message from the OS, may then be configured to initiate the call transfer. This may be achieved by generating a request to the current call origin to hang up and transfer the call to the bearer and network used by the communication client application.

The operation of initiating a call transfer is shown in FIG. 7 by step 717.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

According to a first aspect there is provided a user terminal associated with a first user, the user terminal comprising a communication client application for managing communications with at least one further user terminal over a first network, the communication client application being configured to: determine with respect to at least one incoming call whether a further user terminal at the call origin point comprises the communication client application; and manage the reception of the call based on the determination of whether the further user terminal at the call origin point comprises the communication client application.

In such a manner the management of call receiving may be performed by a communication client application for communications over a first network (such as a skype network) when it is determined that the user terminal at the call origin point is also equipped to handle such communications and invite the user of the other user terminal to install the communication client application otherwise. Such embodiments permit efficient call handling and provide a more flexible method of call handling.

The communication client application configured to manage the reception of the call based on the determination of whether the further user terminal at the call origin point may be further configured to trigger a call transfer such that the reception of the call uses the communication client application over the first network when the further user terminal at the call origin point comprises the communication client application.

The communication client application may be further configured to generate a user interface element based on the determination of the further user terminal at the call origin point comprises the communication client application.

The communication client application may be further configured to control the triggering of the call transfer based on a response to the user interface element.

The communication client application may be further configured to generate an invite for the at least one further user terminal to install the communication client application when the determination of whether the further user terminal at the call origin point determines the further user terminal at the call origin point does not comprise the communication client application.

The communication client application may further be configured to generate a user interface element based on the determination of the further user terminal at the call origin point does not comprise the communication client application, and wherein the communication client application is configured to control the generation of the invite based on a response to the user interface element.

The communication client application configured to determine with respect to at least one incoming call whether a further user terminal at the call origin point comprises the communication client application may be further configured to: receive an incoming call event notification, the incoming call event notification comprising an identifier identifying the user of the at least one further user terminal; generate a search request based on the identifier for a communication client application database; and receive a response to the search request determining whether the at least one further user terminal at the call origin point comprises the communication client application.

The identifier may comprise a incoming call number, wherein the communication client application may be configured to: generate a caller identifier search request comprising the incoming call number; and receive a caller identifier response comprising a caller identifier associated with the incoming call number, wherein the communication client application configured to generate the search request based on the identifier for a communication client application database may be further configured to generate the search request comprising the caller identifier for the communication client application database.

The communication client application may be further configured to: generate an blocked caller search request for a blocked call database; the blocked caller search request comprising an identifier from the at least one incoming call; receive a response to the blocked caller search request determining whether the at least one further user terminal at the call origin point is on the blocked caller database; further manage the reception of the call based on the determination of whether the at least one further user terminal at the call origin point is on the blocked caller database.

The communication client application may further be configured to: monitor the length of the call; and control a generation of a blocked call report based on the length of the call being less than a determined threshold.

The communication client application may be further configured to: generate a blocked call user interface element based on the determination of the length of the call being less than the determined threshold; and control the generation of the blocked call report based on a response to the blocked call user interface element.

The communication client application configured to control a generation of a blocked call report based on the length of the call being less than a determined threshold may be further configured to generate and forward the blocked call report comprising an identifier identifying the further user terminal at the call origin point.

The user terminal may be one of: an Internet-enabled mobile telephone; a handheld game console; a personal digital assistant (PDA); a tablet computer; a laptop computer.

According to a second aspect there is an apparatus comprising: at least one processor; and a memory comprising communication client application code for managing communications with at least one further apparatus over a first network, the code, when executed on the at least one processor, causes the apparatus to: determine with respect to at least one incoming call whether a further apparatus at the call origin point comprises the communication client application; and manage the reception of the call based on the determination of whether the further apparatus at the call origin point comprises the communication client application.

The communication client application code caused to manage the reception of the call based on the determination of whether the further apparatus at the call origin point is further caused to trigger a call transfer such that the reception of the call uses the communication client application over the first network when the further apparatus at the call origin point comprises the communication client application.

The communication client application code may further caused to generate a user interface element based on the determination of the further apparatus at the call origin point comprises the communication client application.

The communication client application code may be further caused to control the triggering of the call transfer based on a response to the user interface element.

The communication client application code may be further caused to generate an invite for the at least one further apparatus to install the communication client application when the determination of whether the further apparatus at the call origin point determines the further apparatus at the call origin point does not comprise the communication client application.

The communication client application code may be further caused to generate a user interface element based on the determination of the further apparatus at the call origin point does not comprise the communication client application, and wherein the communication client application code may be further caused to control the generation of the invite based on a response to the user interface element.

The communication client application code caused to determine with respect to at least one incoming call whether a further apparatus at the call origin point comprises the communication client application may be further caused to: receive an incoming call event notification, the incoming call event notification comprising an identifier identifying the user of the at least one further apparatus; generate a search request based on the identifier for a communication client application database; and receive a response to the search request determining whether the at least one further apparatus at the call origin point comprises the communication client application.

The identifier may comprise an incoming call number, wherein the communication client application code may be caused to: generate a caller identifier search request comprising the incoming call number; and receive a caller identifier response comprising a caller identifier associated with the incoming call number, wherein the communication client application configured to generate the search request based on the identifier for a communication client application database is further configured to generate the search request comprising the caller identifier for the communication client application database.

The communication client application code may be further caused to: generate an blocked caller search request for a blocked call database; the blocked caller search request comprising an identifier from the at least one incoming call; receive a response to the blocked caller search request determining whether the at least one further apparatus at the call origin point is on the blocked caller database; further manage the reception of the call based on the determination of whether the at least one further apparatus at the call origin point is on the blocked caller database.

The communication client application code may be further caused to: monitor the length of the call; and control a generation of a blocked call report based on the length of the call being less than a determined threshold.

The communication client application code may be further caused to: generate a blocked call user interface element based on the determination of the length of the call being less than the determined threshold; control the generation of the blocked call report based on a response to the blocked call user interface element.

The communication client application code caused to control a generation of a blocked call report based on the length of the call being less than a determined threshold may be further caused to generate and forward the blocked call report comprising an identifier identifying the further apparatus at the call origin point.

According to a third aspect there is provided a method for managing communications between user terminals over a first network, the method comprising: determining with respect to at least one incoming call whether a user terminal at the call origin point comprises the method for managing communications between user terminals over a first network; and managing the reception of the call based on the determination of whether the user terminal at the call origin point comprises the method for managing communications between user terminals over a first network.

Managing the reception of the call based on the determination of whether the user terminal at the call origin point may be further caused to trigger a call transfer such that the reception of the call uses the method for managing communications between user terminals over a first network when the user terminal at the call origin point comprises the method for managing communications between user terminals over a first network.

The method may further comprise generating a user interface element based on the determination of the user terminal at the call origin point comprises the method for managing communications between user terminals over a first network.

The method may further comprise controlling the triggering of the call transfer based on a response to the user interface element.

The method may further comprise generating an invite for the at least one further user terminal to install the method for managing communications between user terminals over a first network when the determination of whether the further user terminal at the call origin point determines the user terminal at the call origin point does not comprise the method for managing communications between user terminals over a first network.

The method may further comprise generating a user interface element based on the determination of the user terminal at the call origin point does not comprise the method for managing communications between user terminals over a first network; and controlling the generation of the invite based on a response to the user interface element.

Determining with respect to at least one incoming call whether a further user terminal at the call origin point comprises the method for managing communications between user terminals over a first network may comprise: receiving an incoming call event notification, the incoming call event notification comprising an identifier identifying the user of the at least one user terminal at the call origin point; generating a search request based on the identifier for a method for managing communications between user terminals over a first network database; and receiving a response to the search request determining whether the at least one user terminal at the call origin point comprises the method for managing communications between user terminals over a first network.

The identifier may comprise an incoming call number, wherein the method may comprise: generating a caller identifier search request comprising the incoming call number; and receiving a caller identifier response comprising a caller identifier associated with the incoming call number, wherein generating the search request based on the identifier for a method for managing communications between user terminals over a first network database may comprise generating the search request comprising the caller identifier for the method for managing communications between user terminals over a first network database.

The method may further comprise: generating an blocked caller search request for a blocked call database; the blocked caller search request comprising an identifier from the at least one incoming call; receiving a response to the blocked caller search request determining whether the at least one further user terminal at the call origin point is on the blocked caller database; and further managing the reception of the call based on the determination of whether the at least one further user terminal at the call origin point is on the blocked caller database.

The method may further comprise: monitoring the length of the call; and controlling a generation of a blocked call report based on the length of the call being less than a determined threshold.

The method may comprise: generating a blocked call user interface element based on the determination of the length of the call being less than the determined threshold; controlling the generation of the blocked call report based on a response to the blocked call user interface element.

Controlling a generation of a blocked call report based on the length of the call being less than a determined threshold may further comprise generating and forwarding the blocked call report comprising an identifier identifying the user terminal at the call origin point.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
at least a memory and a processor to implement a communication client application configured to manage communications over a communication network, the communication client application configured to cause the user terminal to perform operations comprising:
detecting an incoming call initiated from an additional user terminal using a different communication client over a different communication network;
receiving an identifier of a user of the additional user terminal;
generating a search request based on the identifier and communicating the search request to a communication client application database;
receiving a response to the search request and determining whether the additional user terminal has installed the communication client application based at least in part on the response to the search request;
responsive to determining that the additional user terminal has installed the communication client application, triggering a transfer of the incoming call such that reception of the incoming call uses the communication client application over the communication network; and responsive to determining that the additional user terminal has not installed the communication client application, generating an invite for the additional user terminal to install the communication client application.

2. The user terminal according to claim 1, wherein the communication client application is further configured to generate a user interface element based on the determination that the additional user terminal has installed the communication client application.

3. The user terminal according to claim 2, wherein the communication client application is configured trigger the transfer of the incoming call based at least in part on a response to the user interface element.

4. The user terminal according to claim 1, wherein the communication client application is further configured to generate a user interface element responsive to determining that the additional user terminal has not installed the communication client application, and wherein the communication client application is configured to control the generation of the invite based on a response to the user interface element.

5. The user terminal according to claim 1, wherein the identifier comprises an incoming call number, and wherein the communication client application is further configured to:
generate a caller identifier search request that includes the incoming call number; and
receive a caller identifier response that includes a caller identifier associated with the incoming call number.

6. The user terminal according to claim 1, wherein the communication client application is further configured to:
generate a blocked caller search request for a blocked call database, the blocked caller search request comprising an identifier associated with the at least one incoming call;
receive a response to the blocked caller search request and determine whether the additional user terminal is on the blocked caller database;
manage the reception of the call based at least in part on the determination of whether the additional user terminal is on the blocked caller database.

7. The user terminal according to claim 1, wherein the communication client application is further configured to:
monitor a length of the call; and
control a generation of a blocked call report based on the length of the call being less than a determined threshold.

8. The user terminal according to claim 7, wherein the communication client application is further configured to:
generate a blocked call user interface element based on the length of the call being less than the determined threshold; and
control the generation of the blocked call report based at least in part on a response to the blocked call user interface element.

9. The user terminal according to claim 7, wherein the communication client application is further configured to generate and forward the blocked call report comprising an identifier identifying the additional user terminal.

10. The user terminal according to claim 1, wherein the user terminal is one of:

an Internet-enabled mobile telephone;
a handheld game console;
a personal digital assistant (PDA);
a tablet computer; or a laptop computer.

11. An apparatus comprising:
at least a memory and a processor to implement a communication client application configured to manage communications over a communication network, the communication client application configured to cause the apparatus to perform operations comprising:
detecting an incoming call initiated from an additional apparatus using a different communication client over a different communication network;
receiving an identifier of a user of the additional apparatus;
generating a search request based on the identifier and communicating the search request to a communication client application database;
receiving a response to the search request and determining whether the additional apparatus has installed the communication client application based at least in part on the response to the search request;
responsive to determining that the additional apparatus has installed the communication client application, triggering a transfer of the incoming call such that reception of the incoming call uses the communication client application over the communication network; and
responsive to determining that the additional apparatus has not installed the communication client application, generating an invite for the additional apparatus to install the communication client application.

12. The apparatus according to claim 11, wherein the communication client application is further configured to generate a user interface element based on the determination that the additional apparatus has installed the communication client application.

13. The apparatus according to claim 12, wherein the communication client application is configured to trigger the transfer of the incoming call based at least in part on a response to the user interface element.

14. A method implemented by a communication client application of a device, the communication client application of the device configured to manage communications over a communication network, the method comprising:
detecting an incoming call initiated from an additional device using a different communication client over a different communication network;
receive an identifier of a user of the additional device;
generate a search request based on the identifier and communicating the search request to a communication client application database;
receive a response to the search request and determining whether the additional device has installed the communication client application based at least in part on the response to the search request;
responsive to determining that the additional device has installed the communication client application, triggering a transfer of the incoming call such that reception of the incoming call uses the communication client application over the communication network; and
responsive to determining that the additional device has not installed the communication client application, generating an invite for the additional device to install the communication client application.

15. The method according to claim 14, further comprising generating a user interface element based on the determination that the additional device has installed the communication application.

16. The method according to claim 15, wherein the triggering the transfer of the incoming call is based at least in part on a response to the user interface element.

17. The method according to claim 14, further comprising generating a user interface element responsive to determining that the additional device has not installed the communication client application, and wherein the generation of the invite is based at least in part on a response to the user interface element.

18. The method according to claim 14, wherein the identifier comprises an incoming call number.

19. The method according to claim 18, further comprising:
generating a caller identifier search request that includes the incoming call number; and
receiving a caller identifier response that includes a caller identifier associated with the incoming call number.

20. The method according to claim 14, further comprising:
generating a blocked caller search request for a blocked call database, the blocked caller search request comprising an identifier associated with the at least one incoming call;
receiving a response to the blocked caller search request and determining whether the additional device is on the blocked caller database;
managing the reception of the call based at least in part on the determination of whether the additional device is on the blocked caller database.

* * * * *